United States Patent [19]
Brandt

[11] Patent Number: 4,576,086
[45] Date of Patent: Mar. 18, 1986

[54] HYDROPNEUMATIC ENERGY-RECUPERATING RECOIL BRAKE FOR ARTILLERY PIECES AND FIREARMS

[76] Inventor: Francois Brandt, Chalet Le Caribou, 1884 Villars sur Ollon, Vaud, Switzerland

[21] Appl. No.: 540,472

[22] Filed: Oct. 11, 1983

[30] Foreign Application Priority Data

Oct. 14, 1982 [FR] France .................. 82 17233

[51] Int. Cl.⁴ .................................... F41F 19/02
[52] U.S. Cl. ........................................ 89/43.01
[58] Field of Search ................................ 89/43 R

[56] References Cited

FOREIGN PATENT DOCUMENTS 2074243 10/1971 France ...................... 89/43 R

*Primary Examiner*—Stephen C. Bentley
*Attorney, Agent, or Firm*—Beveridge, DeGrandi & Weilacher

[57] ABSTRACT

Hydropneumatic energy-recuperating recoil brake for artillery pieces and firearms.

A hollow rod (8) connected to the recoiling mass slides sealingly inside a cylindrical tubular body (1). A mobile energy-recuperation piston (27) divides the inside of the hollow rod (8) into a first chamber (31) filled with hydraulic liquid and a second chamber filled with gas under pressure. A flow-regulating valve (37) works with a seat (33) fixed to the rod (8) so as to delimit a passageway having a cross-section which varies during the recoil movement of the rod (8) inside the body. The body (37a) of the valve (37) is located upstream of the valve seat (33) with respect to the liquid flow, with the valve (37) moving in the reverse direction to the said flow to open the passageway during recoil of the rod (8).

22 Claims, 10 Drawing Figures

HYDROPNEUMATIC ENERGY-RECUPERATING RECOIL BRAKE FOR ARTILLERY PIECES AND FIREARMS

The object of the present invention is a hydropneumatic recoil brake with partial energy recovery of the type comprising a hollow rod connected with the recoiling mass of an artillery piece or an individual weapon and sliding inside a cylindrical tubular body joined to the fixed frame of the piece or weapon.

It is known that it is necessary on certain individual firearms to provide recoil means capable of holding the reaction of the weapon against the firer's shoulder within reasonable limits. Recoil brakes are also used on artillery pieces and in particular on vehicle-mounted mortars. Since the thrust of this type of medium calibre mortar when the round is fired may be in the order of 30 tonnes it can be understood that, in order to mount a mortar on a vehicle platform, it is necessary to provide means capable of cutting this thrust down by about 10 to 20 times.

Hydropneumatic type recoil brakes are already known in which the recoil movement of the piece's or weapon's gun tube produces movement of hydraulic liquid which compresses a gas, the rise in pressure of which subsequently permits the return to battery, thus achieving at least partial recovery of the recoil energy.

Hydropneumatic recoil brakes are also known comprising a hollow cylindrical tubular body fixed rigidly to the frame of the piece or weapon and inside which there slides a hollow tube with a leaktight seal with the tube being joined to the recoiling mass of the piece or weapon. The annular space contained between the body and the rod is filled with a hydraulic liquid and connects to a first chamber bounded inside the hollow rod by a movable energyrecuperation piston which furthermore bounds a second chamber filled with a gas. A check valve acted on by a spring is installed inside the hollow rod so that it can block the normal passage at the end of the recoil stroke; the compressed gas then acts on the mobile piston and causes the oil to be expelled from the hollow rod to the annular space via a calibrated orifice.

In this type of brake the check valve acted on by a weak return spring is only meant to block the main passage during the return-to-battery movement. During the recoil stroke the valve is completely open, so that the flow passage cross-section of the hydraulic liquid remains virtually constant throughout the recoil movement. In fact the recoil force due to firing of the round is not constant, so that the result is a reaction against the gun mount or the firer's shoulder which is not constant either. Since absorption of the recoil is not constant the internal pressure due to throttling of the hydraulic liquid is very high at the beginning of the recoil stroke and low at the end of the stroke. It is therefore necessary to make a recoil brake sized to admit the highest possible internal pressure at the beginning of recoil.

In addition, for brakes of this type the check is installed so as to move in the same direction as the flow of hydraulic liquid during the recoil stroke. The result is a relatively tortuous path for the hydraulic liquid leading to a considerable pressure drop. At the beginning of the recoil stroke the throttling of the oil is very violent in addition, and this leads to a highly localized and substantial heating.

The object of the present invention is a hydropneumatic recoil brake of the hollow rod and energy-recuperation type for return to battery which has an even and constant braking force enabling the live force of the recoiling mass to be opposed and stopping this mass over a set distance of travel.

An object of the invention is also to provide means making it possible to easily alter the braking force and the recoil stroke length.

Another object of the present invention is a hydropneumatic recoil brake in which the passage of the hydraulic liquid is constantly controlled during the recoil travel by a flow-regulating valve providing a constant braking force throughout the recoil stroke and this for any possible changes in viscosity of the hydraulic liquid with temperature.

In addition the flow-regulating valve provides virtually streamline flow for the hydraulic liquid thus reducing oil fatigue and extending the life of its qualities; the configuration and arrangement of the valve are such that the hydraulic liquid has a cooling effect on the various vital components of the recoil brake. Finally, it is possible to add means to the regulating valve enabling all vibration effects to be prevented.

The hydropneumatic enery-recuperating recoil brake for artillery pieces and firearms according to the invention comprises a cylindrical tubular body joined to the fixed frame of the piece or weapon and containing a hollow tube sliding inside so as to be leaktight and joined to the recoiling mass of the piece or weapon. The annular space lying between the body and the hollow rod is filled with a hydraulic liquid and connects up to a first chamber bounded inside the hollow rod by a free, mobile, energyrecuperating piston which also bounds a second chamber filled with a gas, e.g. nitrogen. A flow-regulating valve is also installed to be mobile inside the hollow rod and elastically acted on in the closing direction. The valve works in conjunction with a seat fixed to the rod so as to delimit a passage having a varying cross-section during the recoil movement of the rod inside the body. The body of the valve is located upstream of the hydraulic liquid flow from the valve seat, with the valve moving in the opposite direction to the said flow so as to open the above-mentioned passage during the recoil movement of the hollow rod.

The valve body is fixed to a control piston sliding in a head portion of the front end of the hollow rod. The valve body and its active part working with the seat have a smaller diameter than the internal diamter of the above-mentioned rod head portion so bounding, between the valve seat and the control piston, an annular chamber having passages in its wall which connect up with the annular space contained between the tubular body of the brake and the hollow rod. Thus, during the recoil movement of the rod the hydraulic liquid lying in the annular space contained between the tubular body of the brake and the rod is forced by the above-mentioned passages into the annular chamber delimited between the valve seat and the piston controlling the flow-regulating valve. Because of the greater diameter of the control piston the pressure exerted in the annular chamber by the hydraulic liquid causes the valve to move in the reverse direction to the flow of the hydraulic liquid which can escape between the active part of the valve and its seat towards the first chamber delimited inside the hollow rod. The mobile piston is thus moved by the increase in the volume of oil contained in the first chamber and compresses the gas located in the second chamber.

In a preferred embodiment of the invention the head portion of the hollow rod inside which slides the valve control piston can be put under gas pressure by means of a check valve. The elastic return of the valve is thus produced by the gas pressure which can be adapted in accordance with the planned utilization, thus leading to a changed braking force and modified recoil movement rate.

In an embodiment of the invention which is more especially suited to an individual weapon only requiring a relatively small braking force it would be possible to use a return spring for the valve instead of gas pressure.

For the return-to-battery movement, which is caused by the pressure of the gas in the second chamber acting on the mobile energy-recuperating piston, it is possible to provide at least one stop preventing complete closure of the valve in order to provide for return of the liquid into the annular space between the tubular body of the brake and the hollow rod and limit the speed of the return to battery. In a variant the valve can be completely closed off. The hollow rod then has at least one calibrated orifice in its wall connecting the abovementioned annular space with the inside of the hollow rod for the return of the hydraulic liquid during the return-to-battery stroke.

In one embodiment of the invention, the valve comprises an anti-vibration element fixed to its nose and provided with guide means working with the rod. The anti-vibration element may advantageously comprise a plate having a smaller diameter than the rod bore so delimiting between the plate and the valve nose an anti-vibration chamber joining up to the first rod chamber via an annular passage remaining between the plate and the rod.

It is possible to provide a stroke adjustment rod which can move axially inside the front end of the body so as to act as a stop which can be adjusted at the front of the rod for the return-to-battery movement.

It is also possible to provide at the front of the hollow rod a return-to-battery shock absorber device comprising a cylindrical tubular body filled with hydraulic liquid fixed to the rod and inside which slides a hollow element enclosing a mobile piston. The mobile piston separates the hollow element into a chamber filled with gas and a chamber filled with hydraulic liquid connected by orifices with the tubular body of the shock absorber device.

The brake of the invention may also comprise additional safety shock absorption means at the end of the recoil travel.

The brake of the invention may also comprise means for providing a fast return to battery.

The invention will be better understood on studying several embodiments described as non-restrictive examples and illustrated by the appended drawings in which.

Figure 1:
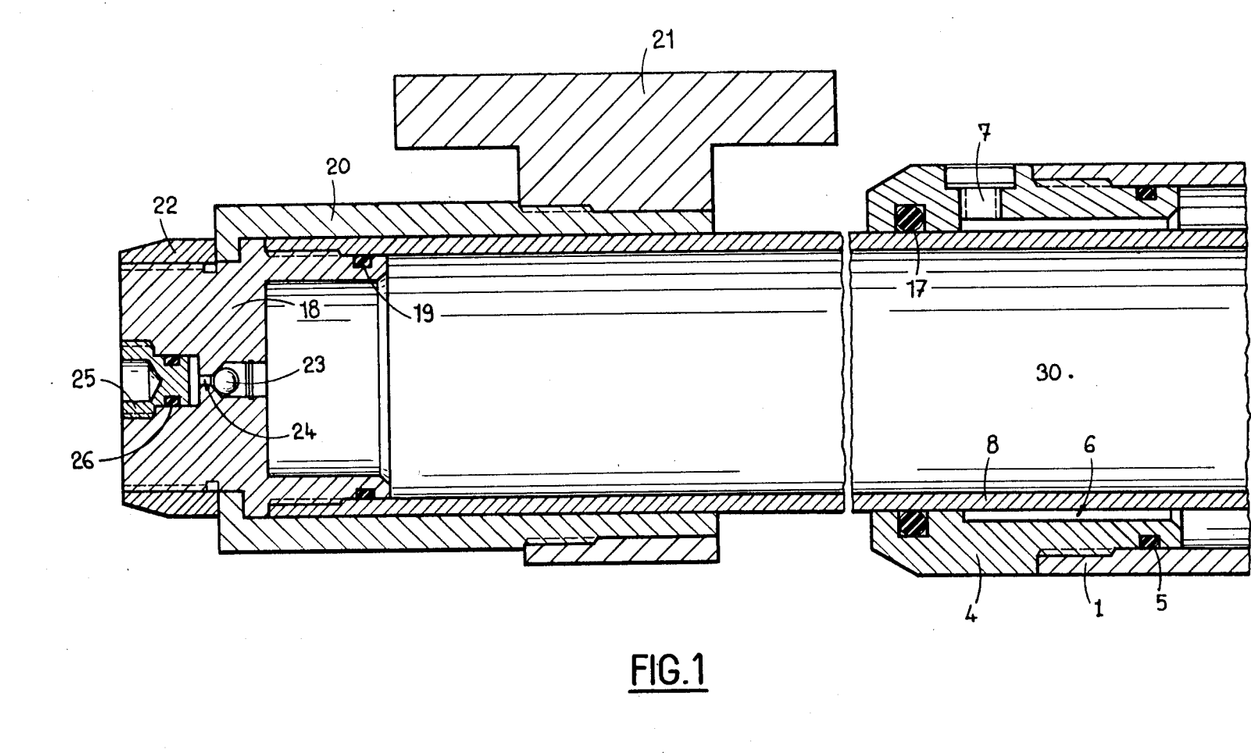
FIGS. 1, 2 and 3 are part longitudinal sections of a first embodiment of a hydropneumatic recoil brake according to the invention.
Figure 2:
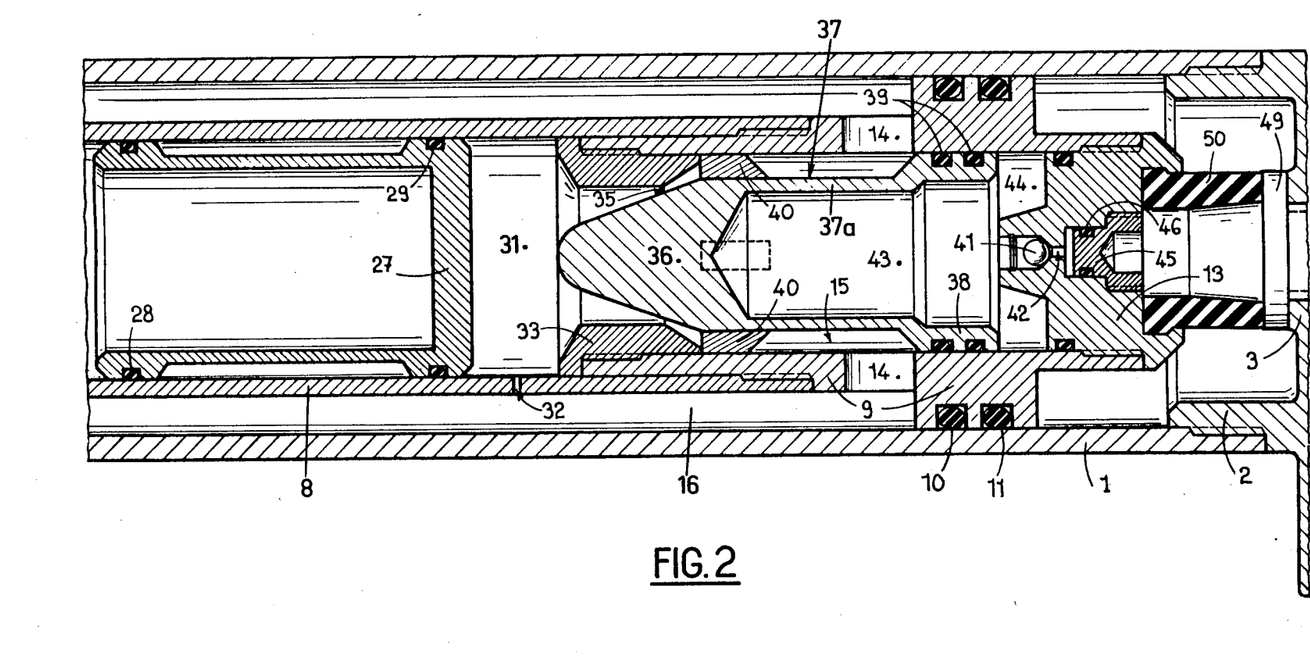
Figure 3:
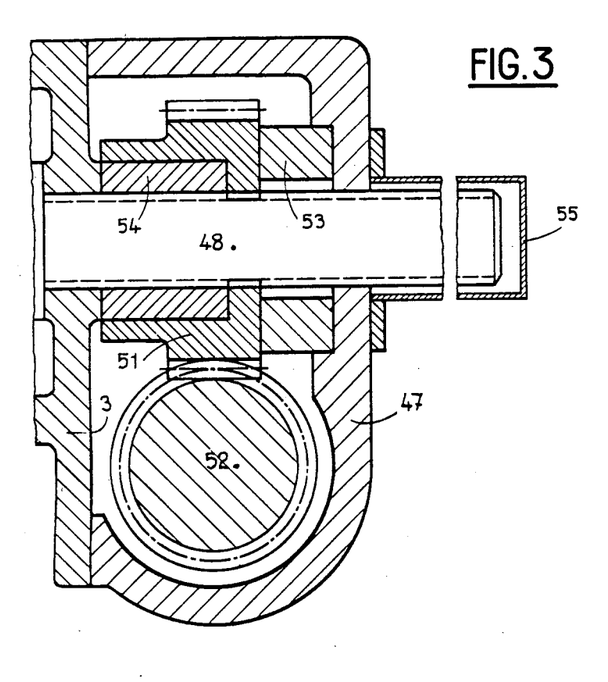

As shown in FIG. 1, 2 and 3, the recoil brake of the invention comprises a cylindrical tubular body 1, designed to be fixed on the frame of an artillery piece such as a mortar or other individual firearm (not illustrated) for example by means of suitable clamps.

The front end of the body 1 comprises a front closer 2 having an end plate 3. The body 1 is provided at its rear end with an endpiece 4 sealingly fixed onto the wall of the body 1, there being seals 5 provided for this purpose. In this description the term "front" will be taken to indicate the muzzle end of the weapon or piece which is fitted with the recoil brake that is the object of the invention.

The endpiece 4 comprises an annular chamber 6 connecting with a filling orifice which is not shown. A purge orifice 7 is provided in the endpiece 4.

Inside the body 1 a hollow rod 8 slides sealingly and without any play; the front end of this rod 8 located inside the body 1 is sealingly closed by an inside head 9 including a band comprising seals 10, 11 which acts as a piston in the body 1. This inside head 9 is closed by a plug 13 and it again comprises orifices 14 joining an annular chamber 15 delimited inside the head 9 with the annular space 16 contained between the body 1 and the hollow rod 8.

The hollow rod 8 slides without play in the endpiece 4 of the body 1 and a seal 17 makes the whole assembly leaktight. The back end of the hollow rod 8 emerging from the body 1 is sealingly closed by an outside head 18 screwed onto the rod 8, with a seal 19 for leaktightness. A sleeve 20 surrounding the back end of the rod 8 and bearing against a portion of the head 18 provides for the rod 8 to be fixed in a collar 21 fixed to the recoiling mass of the piece or weapon. A nut 22 screwed onto the outside head 18 of the hollow rod contains a ball check valve 23 closing a duct 24 for filling the internal space in the hollow rod 8. A screwed plug 25 comprising a seal 26 is again provided for permanent closure apart from the duct 24 filling operations.

A mobile piston 27 slides freely inside the hollow rod 8, with seals 28, 29 providing leaktightness between this piston 27 and the rod 8. The piston 27 separates the internal cavity of the hollow rod 8 into two chambers 30 and 31. The first chamber 31 located between the mobile piston 27 and the inside head 9 connects with the annular space 16 located between the hollow rod 8 and the body 1 via a calibrated passage of small cross-section. It will be noted that the passage 32 can be eliminated in one variant.

The inside head 9 comprises, at the end facing the first chamber 31 of the rod 8, a seat 33 having a tapered profile; the smallest diameter cross-section of this profile delimits, with the conical shaped valve nose 36 of a valve of valve closure 37, a through opening between the chamber 31 and the annular chamber 15 of the head 9. The valve nose 36 extends beyond the seat 33 into the chamber 31. The valve 37 comprises a cylindrical shaped body 37a and has an outside diameter that is less than the internal diameter of the head 9 inside which the valve 37 slides. The body 37a has a skirt 38 at its opposite end which forms a control piston and is provided with seals 39 and slides freely inside the head 9. It will be noted that the skirt 38 of the control piston and the body 37a delimit, with the seat 33 and the bore of head 9, the annular chamber 15 which is connected by the passages 14 with the annular space 16. Close to the valve cone 36 the valve 37 comprises radial lugs 40 serving to guide the valve 37 and coming into contact with the front face of the seat 33 due to the elastic action acting on the valve, so delimiting a minimum passage cross-section between the seat and the valve cone 36. In a variant it is possible to modify the lugs 40 so that they no longer come into contact with the front face of the seat 33. In this case the calibrated opening 32 alone allows the hydraulic liquid to return.

The plug 13 comprises a ball check valve closure 41 closing a filling passage 42 giving access to a chamber formed by an internal recess 43 in the valve 37 and the terminal portion 44 of the recess in the head 9 of the hollow rod 8. After filling this chamber 43, 44 with a gas, notably nitrogen, to the required pressure a plug 45 fitted with a seal 46 is screwed into the plug 13 to close off the passage 42 permanently. The pressure of the gas in the chamber 43, 44 depends on the desired braking force. It may be around 60 bars for an individual weapon and around 110 bars for an 81-mm mortar. In certain specific cases the elastic action due to the pressure of the gas in chamber 43 can be replaced by a powerful enough elastic element.

The second chamber 30 of the hollow rod 8 is filled with a gas under pressure, like nitrogen. The pressure of this gas is determined in accordance with the recoil stroke, the recoiling mass and the required speed of return to battery. To give examples the initial pressure of the gas before firing may be in the order of 4 bars for an individual weapon and around 16 bars for an 81-mm mortar.

The annular space 16 between the body 1 and the hollow rod, as well as the annular chamber 15 in the inside head 9 are filled with a hydraulic liquid, oil as a general rule.

In the illustrated embodiment the recoil brake is further equipped with a recoil stroke length adjustment system, i.e. one adjusting the size of the relative displacement between the hollow rod 8 and the body 1. This adjustment system is contained in a casing 47 fixed on the end plate 3 of the body 1 and comprises a threaded adjustment spindle 48 passing through the end plate 3; the end of this threaded spindle 48 which enters the body 1 is designed to come into contact through a stop 49 with a shock absorber 50, made of rubber for example, fixed to the plug 13.

The axial position of the threaded spindle 48 can be adjusted by means of a nut 51 engaging with the threaded spindle and bearing teeth round its periphery which engage with a worm 52 pivoted inside the casing 47 and one end of which, fitted with an operating means not shown, is accessible from outside the casing. The axial position of the nut 51 is defined with respect to the casing 47 by annular packing pieces 53, 54, with the latter also simultaneously locating the nut 51 on the centre line of the spindle 48. In the example shown the free end of the threaded spindle 48 emerges from the casing 47 and is protected by a cap or jacket 55 fastened to this casing 47.

When the recoil brake that is the object of the invention is installed on a mortar it is then possible to lower the muzzle of the barrel and facilitate muzzle loading for firing at low muzzle velocities.

Operation of the recoil brake described is as follows:
The user adjusts the total stroke of the recoil brake in accordance with the charge employed, the ammunition used and the ambient temperature by adjusting the relative position, corresponding to the return-to-battery position, of the hollow rod 8 with respect to the body 1 using the worm 52, the nut 51 and the threaded spindle 48. The recoil brake is then in its position illustrated in FIGS. 1, 2 and 3.

When the round is fired the recoil force leads to relative displacement as between the hollow rod 8 connected to the recoiling mass and the body 1 connected to the fixed frame, with the rod 8 being moved back, i.e. to the left in FIGS. 1, 2 and 3, and being withdrawn from the body 1. During this process the oil contained in the annular space 16 is forced, via the passages 14 whose large diameter means that the pressure drop is only low, into the annular chamber 15 where the oil pressure acts on the control piston formed by the skirt 38, thus moving the valve 37 forwards, i.e. to the right in FIG. 2, and further opening the way between the valve cone 36 and the seat 33. This movement, which takes place against the approximately constant pressure of the gas contained in chamber 43 therefore produces regulation of the flow and of the braking force which are now held constant throughout the recoil stroke. It will be noted that the oil in the annular chamber 15 flows to the chamber 31 along a roughly straight-line path in the opposite direction to the opening movement of the valve 37. Moreover the conical profile of the seat 33 further improves the flow conditions. Finally the virtually streamline flow of the hydraulic liquid all round the body 37a of the valve 37 limits the heating of the valve bearing surface and encourages regular heat dissipation. The oil entering chamber 31 in the rod pushes back the mobile piston 27 compressing the gas contained in the second chamber 30 of the hollow rod 8.

The valve 37 therefore forms an automatic regulator of the resistance opposed to recoil. Indeed, the greater the recoil force the more the recoil speed increases, the valve 37 being pushed back against its elastic recoil action—here the gas pressure in chamber 43, 44. Thus the liquid throughflow cross-section between the valve cone 36 and the valve seat 33 is automatically changed to suit the recoil force so that the resistance to this force stays roughly constant throughout the stroke. Since the recoil resistance force is practically constant the pressures obtaining notably inside the annular space 16 and the chamber 31 during recoil remain approximately constant as well. Thus the construction of the brake can be optimized since surge pressures are eliminated.

When the gun barrel of the piece or weapon is immobilized, all the energy of the recoiling mass having been taken up in the recoil brake, the return to battery is performed smoothly but with a sufficient force equal to several times the weight of the recoiling mass, due to the action of the gas compressed in the second chamber 30 of the rod 8 which also moves the mobile piston 27 towards the valve 37. The return of the oil into the annular space 16 occurs either through one or more calibrated orifices 32 or through the valve 37 itself when this comprises stops 40 preventing its complete closure.

At the end of the return-to-battery travel the hollow rod 8 comes into contact through its shock absorber 50 with the end 49 of the threaded spindle 48 and is held in this position by the gas pressure obtaining in the chamber 30 of the hollow rod.

Figure 4:
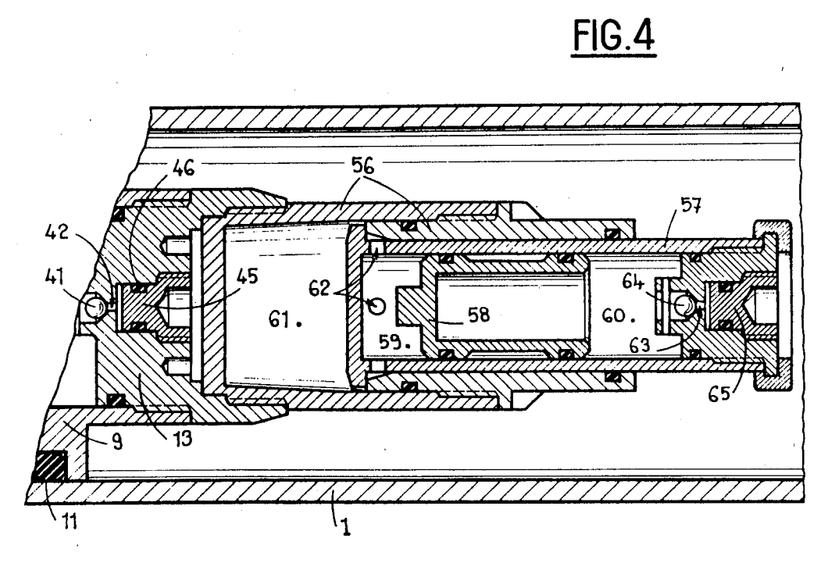
FIG. 4 is a part section view of a return-to-battery shock absorber device which can be used in a recoil brake according to the invention.

FIG. 4 shows a return-to-battery shock absorber which can be installed at the front end of the hollow rod 8. In this figure similar parts carry the same reference numbers.

The plug 13 in the inside head 9 has a hydropneumatic recoil shock absorber comprising a cylindrical tubular body 56 screwed onto the said plug 13 inside which sealingly slides a hollow cylindrical element 57 containing a free loose or mobile piston 58 delimiting two chambers 59, 60 in this hollow element 57. Chamber 59 joins with a chamber 61 in the body 56 through openings 62, whilst chamber 60 is closed and connected to the outside by a filling duct 63 closed by a ball check valve 64 and a plug 65. Chamber 60 is filled with gas, such as nitrogen, at a set pressure whilst chamber 61 in the body is filled with oil.

The nose of the cone 36 of the valve 37 directed towards chamber 31 in the hollow rod 8 can have any suitable shape: flared, bulbous, plate-shaped, etc. designed to reduce or eliminate any vibration or hunting of the valve cone when the brake is operating.

Figure 5:
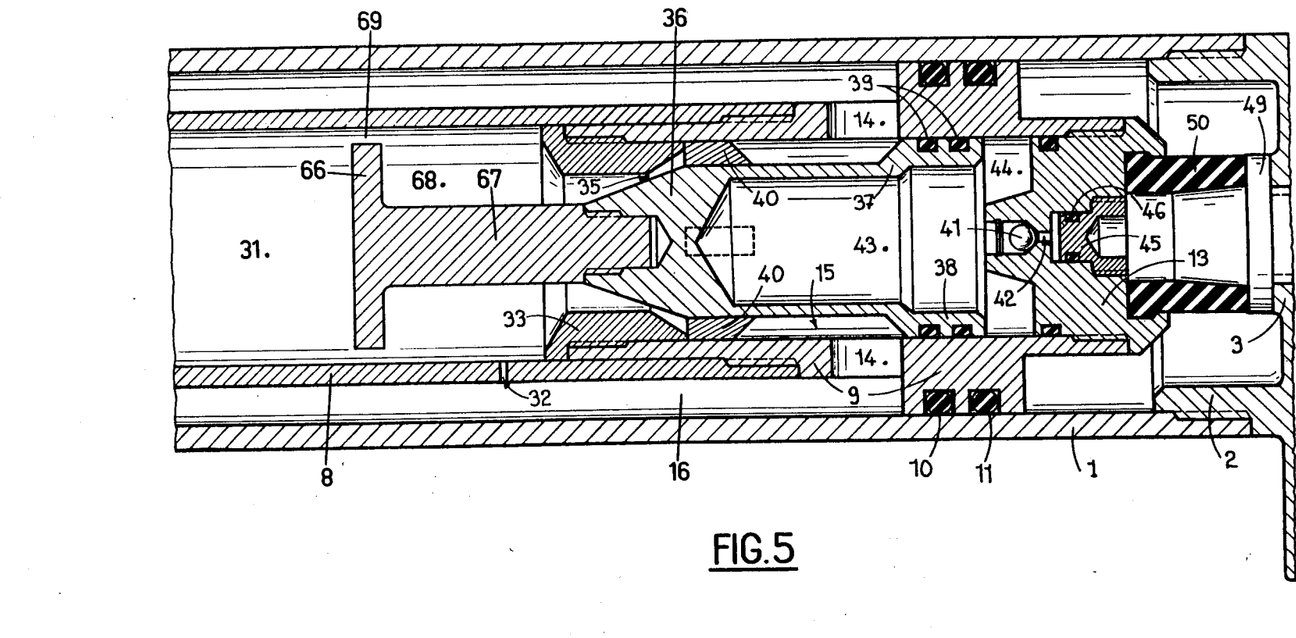
FIG. 5 is a part section view of a hydraulic brake variant according to the invention comprising an anti-vibration device fixed to the flow-regulating valve.

Relating to this, FIG. 5 illustrates an embodiment of an anti-vibration device. In this figure the same parts bear the same reference numbers.

The anti-vibration device comprises a plate 66 having a smaller diameter than the bore of the hollow rod 8. The plate is mounted at the end of a cylindrical body 67 screwed onto the end of the valve nose 36. An anti-vibration chamber is thus delimited between the plate 66 and the con nose 36 of the valve 37; the said anti-vibration chamber 68 connects with the first chamber 31 via an annular passage remaining between the outer periphery of the plate 66 and the bore of the hollow rod 8.

Figure 6:
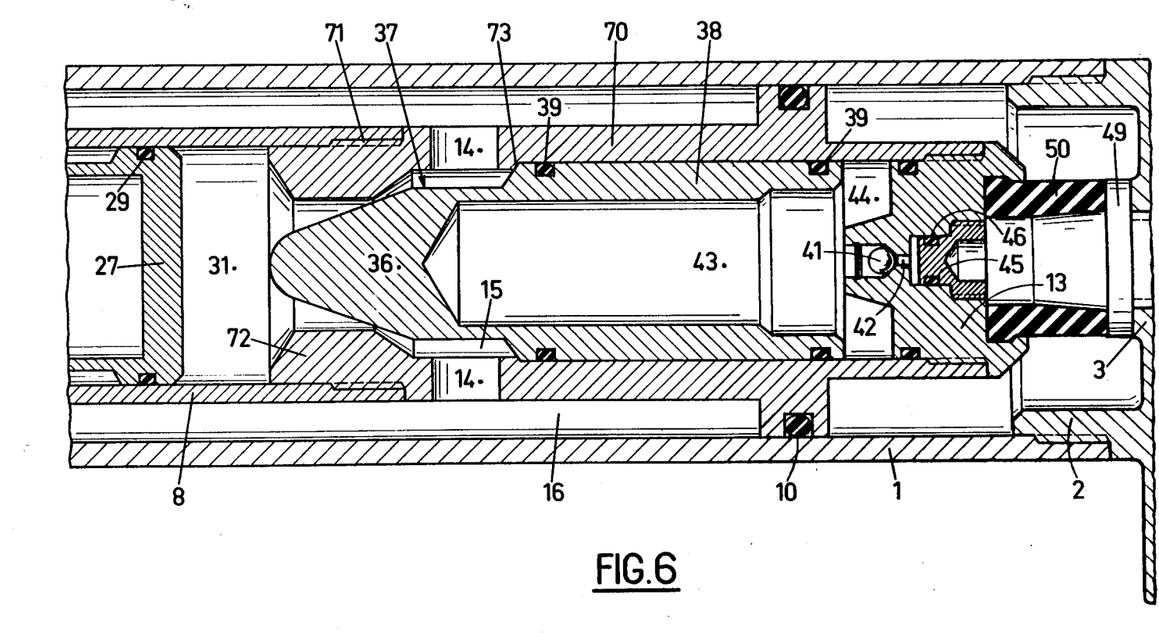
FIG. 6 is a part section view of another variant comprising a modification of the flow-regulating valve.

In the variant illustrated in FIG. 6 in which analogous pieces carry the same reference numbers the construction of the valve 37 has been slightly altered. In this variant the skirt 38 forming the control piston and, fitted with seals 39, has a long enough axial length, for example about 1.6 times its outside diameter, to provide guidance for the valve 37 during its opening and closing movements. Under these conditions the radial lugs 40 of the other embodiments are no longer necessary to ensure the valve 37 is guided.

Furthermore, in this embodiment the inside head 70 fixed to the end of the hollow rod 8 by the thread 71 has, as an integral part on the end thereof which faces the first chamber 31 of the rod 8, the valve seat 72 which has a profile identical to seat 33 in the preceding embodiments and also works in conjunction with the unchanged cone nose 36 of the valve 37. In order to prevent the valve 37 from closing completely on its seat 72 the wall of the inside head 9 has a shoulder 73 which acts as a stop for the frontal face of the skirt 38.

Of course the annular chamber 15, connecting through passages 14 with the annular space 16, also occurs in this embodiment.

Figure 7:
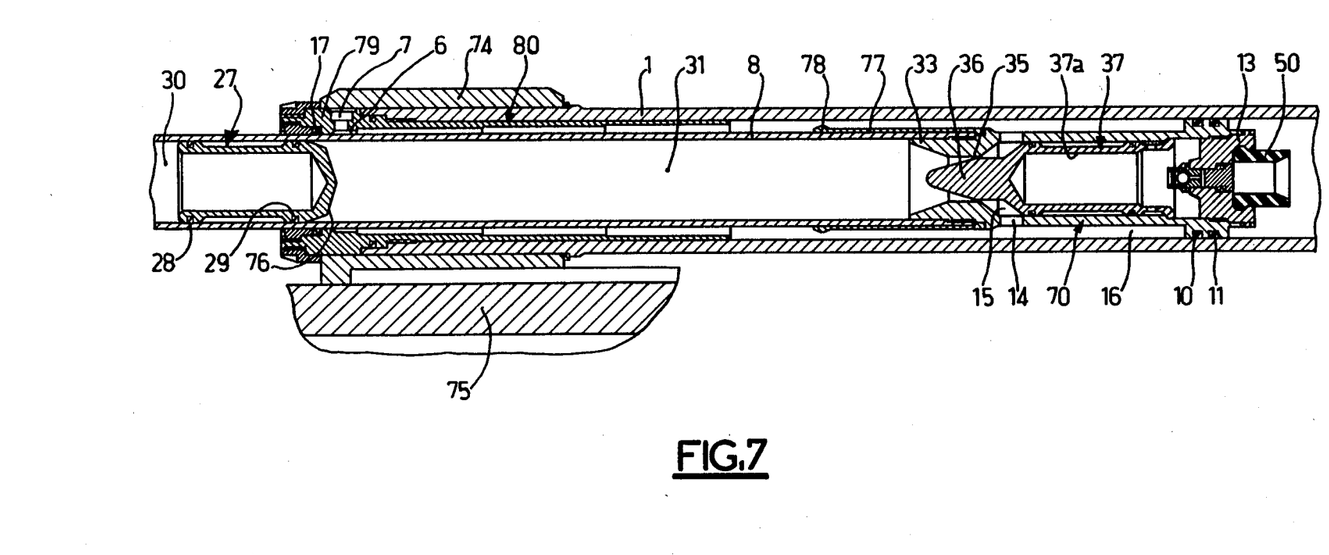
FIG. 7 is a part section view of a variant provided with a device providing additional shock absorption at the end of the recoil travel.
Figure 8:
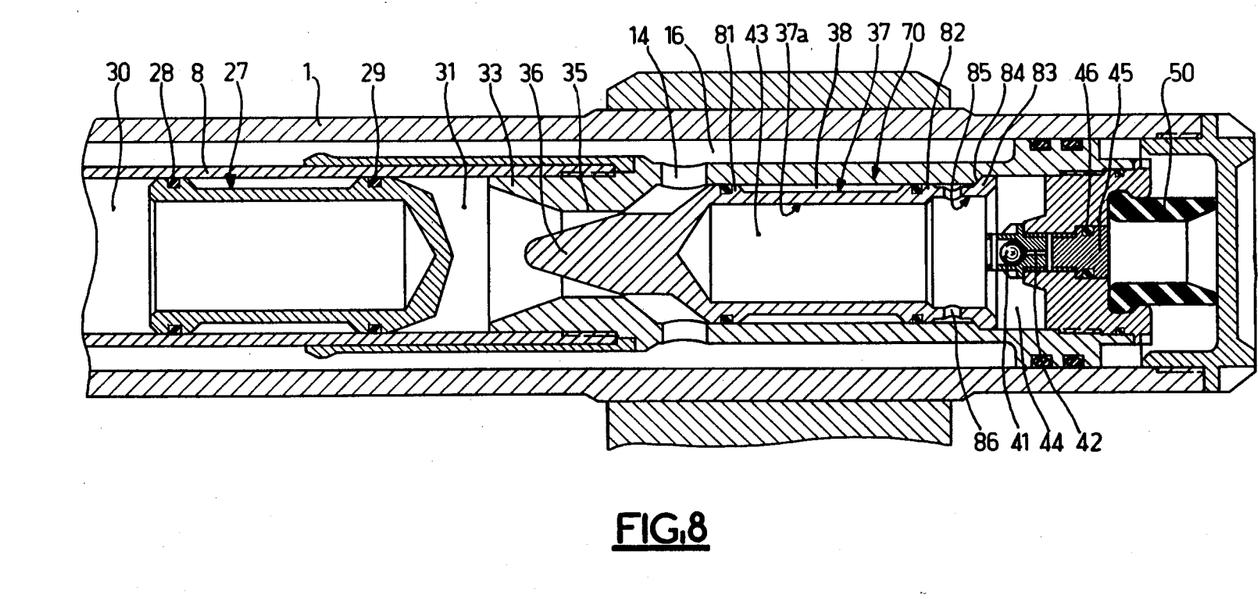
FIG. 8 is a large-scale part view of the variant of FIG. 7.

The embodiment shown in FIGS. 7 and 8 in which identical parts carry the same reference numbers differs from the previous variants mainly in the shape of the mobile piston 27 and in the structure of the valve 37.

In FIG. 7 we find the general layout of the preceding embodiments, the body 1 being fixed, however, by a further intermediate collar 74 to the recoiling mass 75.

In this embodiment the face 76 of the mobile piston 27 facing the valve 37 has a convex conical shape instead of the flat shape of the preceding embodiments. This prevents any risk of air being held in when the body 1 and the hollow rod 8 are filled with hydraulic liquid.

Furthermore, in this embodiment a sleeve 77 is mounted at the front end of the hollow rod 8. The sleeve 77 has a peripheral bulge 78 which therefore amounts to a localized enlargement of the outside diameter of the hollow rod 8. The endpiece 79 which sealingly closes the back end of the body 1 and which, like endpiece 4 in the previous embodiments, delimits an annular chamber 6, has an extension 80 running forwards, with an inside diameter increasing from the back to the front. In the embodiment illustrated this increase occurs in three stages having different diameters.

In these circumstances the end of the recoil travel leads to the bulge 78 entering the bore in the annular extension 80 with its decreasing diameter thus producing an increase in the braking effect at the end of the recoil stroke. In practice the construction is so designed that the normal recoil, during which the brake acts as indicated above in relation to the description of the embodiments of FIGS. 1 to 6, works without the bulge 78 entering inside the extension 80. The further travel therefore amounts to a safety travel enabling impact to be prevented in the case of abnormal surge pressure due to a firing incident. This case could occur, for example, with a mortar fitted with the brake according to the invention if it received a second projectile whilst a first projectile still remained in the bottom of the mortar barrel after a misfire.

In the embodiment illustrated in FIGS. 7 and 8 the valve 37 has also been modified as can be seen more clearly in the enlarged view in FIG. 8.

The overall shape of the valve 37 is similar to that of the variant illustrated in FIG. 6 to the extent that the skirt acting as the control piston has a long enough axial length to provide guidance of the valve 37 during its opening and closing movements. This guidance is provided by means of the bearing surfaces 81 and 82. In this embodiment the stop 83 limiting the closure movement of the valve 37 is located on the front end of the body 37a of the valve 37 on the opposite side from the nose 36. The stop 83 consists of a larger diameter bearing surface at the end of the body 37a which works in conjunction with a shoulder 84 on the inside head 70.

The front end section 85 of the body 37a of the valve 37, located between the bearing surface 82 and the stop 83, has a wall with holes 86 in it which enable the gas pressure to be equalized during the movement of the valve 37 between the internal recess 43 of the valve 37 and the terminal portion 44 of the head 70.

Figure 9:
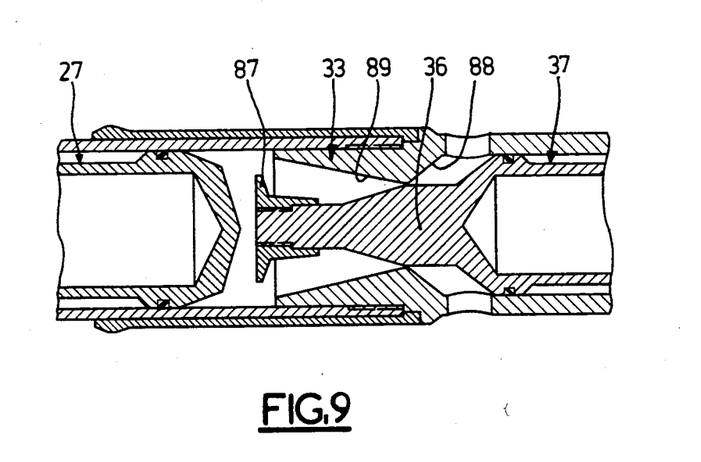
FIG. 9 is a part section view of a valve variant.

FIG. 9 gives a section view illustrating part of the nose 36 of the valve 37 according to another embodiment variation which, like the variant in FIG. 5, has an anti-vibration device fitted on the end of the nose 36. In this embodiment the anti-vibration plate 87 is mounted on the end of the nose just behind the valve seat 33. In addition the seat 33 has an internal profile which converges 88 on the valve 37 side and diverges 89 on the side of the mobile piston 27. In this embodiment the seat 33 has no intermediate cylindrical portion as was the case in the other embodiments.

Figure 10:
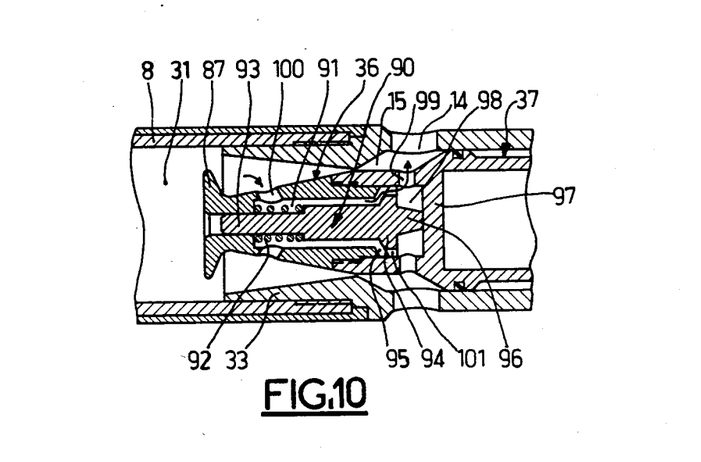
FIG. 10 is a part section view of another valve variant comprising additional means of throughflow during the return to battery.

The variant in FIG. 10 differs from the preceding embodiments basically in the addition of a means facilitating a more rapid return to battery than in these previous embodiments. In this variant the nose 36 of the valve 37 is hollow, there being a piston valve 90 able to slide inside a chamber 91 and subjected to the action of a balancing compression spring 92 fitted round a rod 93 fixed to the back portion of the piston 90. The front portion of the piston comprises a shoulder 94 acting as a valve closure and able to work in conjunction with a seat 95 inside the chamber 91.

An extension 96 to the piston 90 butts against a front wall 97 of the valve 37 which bounds a second chamber 98 inside the nose 36 of the valve 37.

Holes 99 join the annular chamber 15 with the chamber 98. Holes 100 join the first chamber 31 of the hollow rod 8 with the chamber 91 in the nose 36. Axial passages 101 are also provided round the periphery of the valve 94.

During the return to battery movement the pressure of the hydraulic liquid in the first chamber 31 which is connected to the chamber 91 is higher than the pressure obtaining in the annular space 15 which is connected to chamber 98. The result is a movement of the piston 90 towards the front (to the right in FIG. 10), unsticking the valve 94 from its seat 95 and freeing passages 101 so joining up the two chambers 91 and 98 made inside the nose 36, which allows the hydraulic liquid to flow directly from the first chamber 31 in the hollow rod 8 to the annular chamber 15, with the liquid following the path indicated by the arrows in FIG. 10. This passage has a larger diameter than the passage remaining between the outer surface of the nose 36 and the seat 33. Therefore the return-to-battery movement is performed faster than in the other embodiments.

During the recoil movement the pressure in the annular chamber 15 is, on the contrary, higher than the pressure in the first chamber 31. The pressure obtaining in the annular chamber 15 which is connected to the chamber 98 makes the piston 90 move against the balancing spring 92 thus closing any way through the inside of the nose 36.

It will also be noted that in the embodiment illustrated in FIG. 10 the anti-vibration plate 87 is not fixed, as in the embodiment of FIG. 9, to an additional element screwed onto the end of the nose 36 but, on the contrary, forms an integral part of the said nose 36.

I claim:

1. A hydropneumatic energy-recuperating recoil brake for artillery, infantry and other weapons, comprising a cylindrical tubular body (1) connected to a fixed frame of the weapon and inside which sealingly slides a hollow rod (8) connected to the recoiling mass of the weapon, an annular space (16) between said body (1) and said rod (8) being filled with a hydraulic liquid and connecting with a first chamber (31) delimited inside said rod (8) by a movable energyrecuperating piston means (27) which also delimits a second chamber (30) filled with a gas, a flowregulating valve (37) having a body movably mounted inside said hollow rod and acted on elastically in a closing direction, said valve cooperating with a seat (33) fixed to said rod and so defining a passageway having a cross-section which varies during the recoil movement of said rod inside said body, wherein said valve body is located upstream of the liquid flow with respect to said valve seat (33), with the valve (37) moving in the opposite direction to said flow in order to open the above-mentioned passage during recoil of said rod (8).

2. The recoil brake according to claim 1 wherein said valve body defines a control piston (38) sliding inside a portion (9) of the front end of said hollow rod (8), said valve body and an active part (36) thereof cooperating with said valve seat (33) having a smaller diameter than the inside diameter of the said portion (9) of the rod so as to delimit between said valve seat (33) and said control piston (38), an annular chamber (15) having passages (14) in its wall which connect with said annular space (16) between said body of the brake (1) and said rod (8).

3. The recoil brake according to claim 2, whereby said rod portion (9) inside which slides said control piston (38) can be put under gas pressure by means of a check valve (42).

4. The recoil brake according to claim 1 wherein said valve is acted on by a return spring.

5. The recoil brake according to claim 1 wherein at least one stop means (40, 73, 83) prevents complete closure of the valve in order to permit return of the liquid during the return-to-battery stroke.

6. The recoil brake according to claim 1 wherein at least one stop means (40) is located between an active part of the valve (37) and said passages (14) connecting said annular space (16) with said annular chamber (31).

7. The recoil brake according to claim 2 wherein at least one stop means (73) is located on the back portion of the valve body (37a).

8. The recoil brake according to claim 2 wherein at least one stop means (83) is located at the front end of the valve body (37a), opposite said active part.

9. The recoil brake according to claim 8, wherein the front portion of the valve body (37a) comprises, behind said stop means, a perforated wall (86) allowing the gas pressures on either side of the wall to be equalized.

10. The recoil brake according to claim 1 wherein said valve (37) can be completely closed, with at least one calibrated orifice (32) connecting said annular space with the inside of said hollow rod for the return of the hydraulic liquid during the return-to-battery stroke.

11. The recoil brake according to claim 1 wherein the back end of said rod comprises a closing means (18) fitted with a check valve (23) enabling said second chamber (30) to be put under gas pressure.

12. The recoil brake according to claim 1 wherein an active part of said valve cooperating with said valve seat has an overall conical shape extending beyond said seat (33).

13. The recoil brake according to claim 1 wherein said valve comprises an anti-vibration element secured to its active part and provided with guide means cooperating with said hollow rod.

14. The recoil brake according to claim 13 wherein said anti-vibration element comprises a round plate (66), having a lower diameter than the bore of said hollow rod so as to delimit, between said plate and an active part of said valve, an anti-vibration chamber (68) connected with said first chamber (31) through an annular passage (69) remaining between said plate (66) and said hollow rod (8).

15. The recoil brake according to claim 1 further comprising a stroke adjustment means secured to the front end of said body (1), said spindle means being movable inside said body (1) in order to act as stop means for the front portion of said hollow rod (8) during the return-to-battery stroke.

16. The recoil brake according to claim 1 wherein the front portion of said hollow rod (8) comprises a return-to-battery shock absorber device comprising a cylindrical tubular body (56) filled with hydraulic liquid secured to said hollow rod (8) and inside which slides a hollow element (57) containing a movable piston (58) dividing said hollow element in a primary chamber (60)

filled with a gas and a secondary chamber (59) filled with hydraulic liquid connected by passages (62) with said tubular body.

17. The recoil brake according to claim 16 wherein said hollow element (57) comprises a closing means fitted with a check valve (64).

18. The recoil brake according to claim 1 wherein the face of said movable piston means facing said valve (37) is generally substantially convex or conical in shape.

19. The recoil brake according to claim 1 wherein said hollow rod comprises, close to its front end, an external peripheral bulge (78) engaging, at the end of its travel, with a decreasing diameter bore (1), so as to increase the braking effect at the end of the recoil stroke.

20. The recoil brake according to claim 1 wherein said valve seat has an internal substantially convergent-divergent profile (88,89) similar to a nozzle.

21. The recoil brake according to claim 20 wherein said valve comprises an anti-vibration plate (87) means mounted on the end of an active part of said valve behind said divergent profile (89) of said valve seat.

22. The recoil brake according to claim 1 wherein an active part of said valve has an internal passage (91, 98) directly connecting said first chamber (31) with said annular chamber (15), a closure element (90) being installed inside said valve active part to open said internal passageway during the return-to-battery stroke.

* * * * *